Patented Apr. 22, 1924.

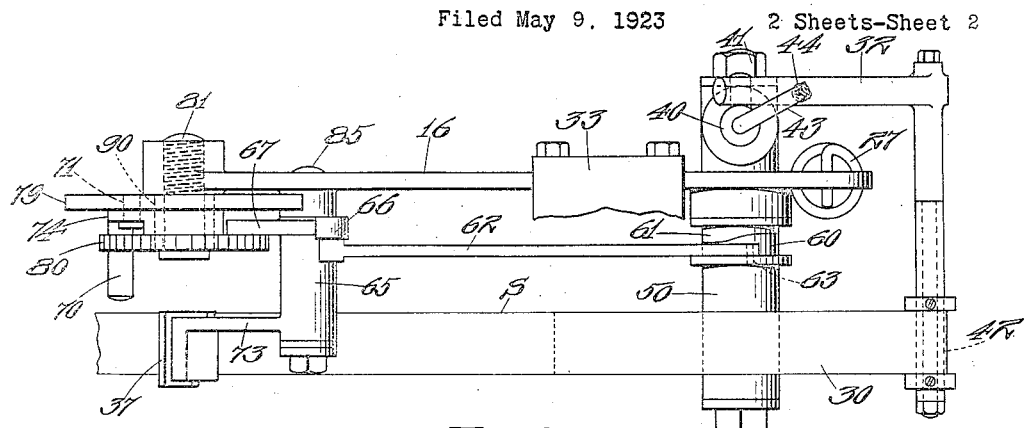

1,491,365

UNITED STATES PATENT OFFICE.

PHILIP O. TENGBERG, OF BOSTON, MASSACHUSETTS, ASSIGNOR TO ANDREW TERKELSEN, OF BOSTON, MASSACHUSETTS.

WRAPPING MACHINE.

Application filed May 9, 1923. Serial No. 637,631.

*To all whom it may concern:*

Be it known that I, PHILIP O. TENGBERG, citizen of the United States, residing at Boston, county of Suffolk, State of Massachusetts, have invented a certain new and useful Improvement in Wrapping Machines, of which the following is a specification, reference being had therein to the accompanying drawings.

This invention relates to wrapping machines of the general type shown and described in an application for Letters Patent, filed June 21, 1921, by George W. Prouty, Serial No. 479,410, and adapted primarily for wrapping annular objects, such, for example, as automobile tires, coils of wire, etc.

A machine of this type comprises a work support by which the object to be wrapped is gradually turned, an annular shuttle which is rotated about the work as the latter is moved therethrough, a reel or the like removed from the shuttle for supplying to the latter wrapping material in the form of a continuous strip which is wrapped about the shuttle as the latter is rotated to wrap said strip about the work, and cutting mechanism between the shuttle and the source of supply for severing the strip of wrapping material after a sufficient quantity thereof has been wrapped upon the shuttle to complete the wrapping of a given object.

The present invention has for its object to provide an improved brake mechanism for the reel which carries the wrapping material, said brake mechanism being connected with and controlled and operated by the cutting mechanism in such manner that when the latter is operated to sever the strip, the rotation of the reel is stopped, thereby preventing the unnecessary unwinding of wrapping material from the reel due to the momentum of the latter.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practiced without departure from its spirit and scope.

In said drawings:

Fig. 2 is an enlarged plan view showing the strip cutting or severing mechanism, the reel brake and tensioning device.

Fig. 3 is an enlarged sectional view taken substantially on the line 3—3, Fig. 1, showing the reel brake construction.

Figure 1:
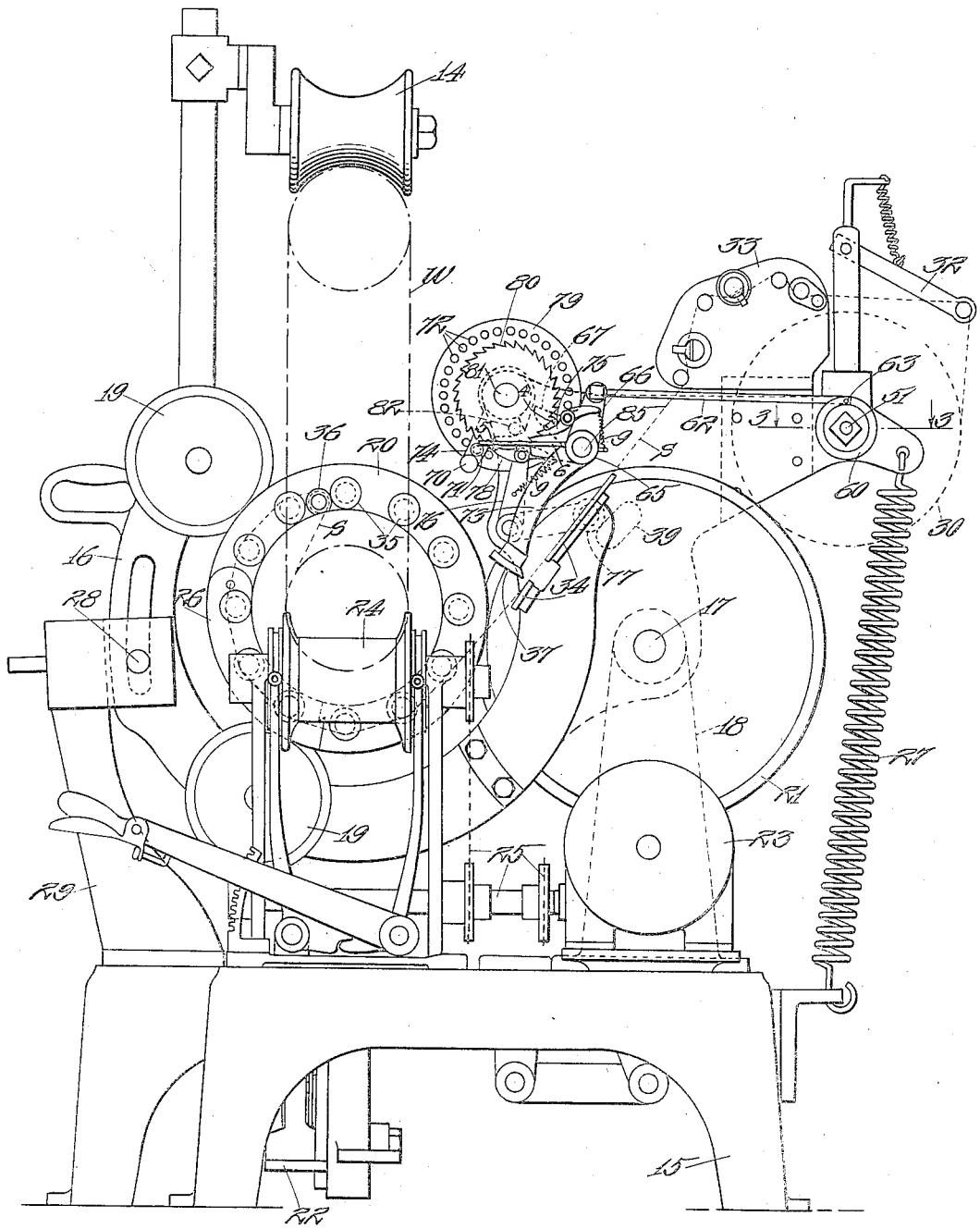
Fig. 1 is a front elevation of the complete machine.

The frame of the machine comprises a base 15 and a yoke 16 which is pivotally mounted on a shaft 17 journalled in an upright 18 rising from the base 15. The yoke 16 is provided with guide rollers 19 for an annular shuttle 20 which is rotated by a driving member in the form of a friction disk 21 secured to the shaft 17 and driven through connections (not shown in detail) under the control of a starting treadle 22 from an electric motor 23. The tire or other work W to be wrapped is held by a weighted roller 14 upon work supporting rollers 24 (only one of which is shown in Fig. 1) which are driven through connections generally indicated at 25 from the motor 23, the arrangement being such that the work W will be turned relatively slowly with respect to the speed of rotation of the shuttle 20. Said shuttle is formed with a hinged segment 26 normally closing a gap through which the work W may be inserted, while the yoke 16 may be adjusted about the axis of the shaft 17 to center the shuttle 20 with respect to annular objects of different sizes, said yoke being counterbalanced by a spring 27 and being locked in adjusted position by means of a clamp 28 on an upright 29 rising from the base 15.

The wrapping material, preferably in the form of a continuous strip S of paper, is supplied from a roll 30 supported by a reel, hereinafter described in detail, carried by the yoke 16. Said paper passes from the roll 30 over a tension device 32, thence through a folding device designated as a whole in Figure 1 by the numeral 33, and thence over a guide plate 34 to the shuttle 20. Said shuttle 20 comprises an annulus having on one face a circular series of rollers 35 about which the strip S is wrapped when the shuttle is rotated, said strip being fed from the shuttle about a guide roller 36 to the work W. Between the shuttle 20 and the source of supply 30 there is provided a cutting mechanism comprising a knife 37 cooperating with a portion of the guide plate 34 to sever the strip S when a sufficient length thereof has been wound around the shuttle rollers 35 to complete the wrapping of the work W. The knife 37 is automatically actuated, as hereinafter more fully explained, after a predetermined number of rotations of the driving disk 21, by a measuring mechanism actuated at each rotation of said driving disk by a cam projection 39 thereon, said measuring mechanism being manually adjustable in accordance with the size of the articles wrapped.

From the foregoing the purpose, relative location, and function of the several instrumentalities of the machine will be sufficiently understood for the purpose of the present case. With the exception of those hereinafter mentioned, and in so far as the others enter into combination therewith, as pointed out in the claims, these parts may be of any suitable construction and arrangement.

Referring now to Figures 1 and 2, the measuring and cutting mechanism, as herein shown, comprises the following construction and arrangement of parts. Mounted on a stud 81 secured to the yoke 16 is a sleeve 90. A disk 79 and a ratchet wheel 80 are secured to the sleeve 90 at opposite ends thereof so as to rotate together with the said sleeve. The disk 79 is provided with a circumferential series of equally spaced holes 72. An adjusting member 74 is rotatably mounted on the sleeve 90 and is provided with a projecting handle 70 for use in the adjustment of the measuring device, said adjusting member 74 having adjacent the disk 79 a removable locking pin 71 which may be fitted by the operator into any one of the holes 72 in said disk. The knife 37 is carried by an arm 73 on a hub 65 mounted to turn on a stud 85 projecting from the yoke 16. The adjusting member 74 is provided with another pin 82 adapted to contact with a second arm 67 on the hub 65 and thereby actuate the knife 37. A pawl 78, to progressively rotate the ratchet wheel 80, is carried by a bell crank 76 pivoted to the yoke 16 and provided with a roller 77 adapted to be engaged by the cam projection 39 on the shuttle driving disk 21. The ratchet wheel is thereby moved one tooth for each rotation of the driving disk 21. A detent pawl 75 is pivoted to the arm 67 to prevent the ratchet wheel 80 and its associated parts from rotating in the opposite direction when the pawl 78 is not engaged with the said ratchet wheel. The pawls 78 and 75 are each provided with a spring 9 to hold them in contact with the ratchet wheel. A pin 4 projects from the member 67 and is adapted to engage and release the pawl 75 at each actuation of the knife. A pin 5 projects from the actuating pawl 78 and is engaged by an arm 6 secured to the hub 65 so as to also engage and release the pawl 78 when the knife is actuated.

In operation, the adjusting member 74 is positioned by means of the handle 70, and the locking pin 71 placed in one of the holes 72 on the disk 79, the location of the pin 71 with respect to the disk 79 depending on the amount of wrapping material necessary for the particular work to be wrapped. When the machine is started, the ratchet wheel 80 will be moved, tooth by tooth, until the pin 82 contacts with the arm 67, forcing the latter downward. The arm 67 in turn causes the hub 65 to turn on the stud 85, thus actuating the knife 37 and severing the strip S. When the member 67 is thus actuated, the pawl 75 will be moved from engagement with the ratchet wheel 80 by the pin 4, projecting from the arm 67, and the pawl 78 will also be moved from its engagement with the said ratchet wheel by the engagement of the arm 6 with the pin 5. It will be seen that the pawls 75 and 78 are kept out of engagement with the ratchet wheel 80, while the arm 67 and its associated parts are in the cutting position. The operator can then return the ratchet wheel 80, perforated disk 79, and adjusting member 74, as a unit, by anti-clockwise movement, to their former and adjusted position without readjusting the member 74 with respect to the perforated disk 79. The several parts may then be returned to their former positions for the beginning of a new wrapping operation by raising the arm 73.

The reel, shown enlarged in Figures 2 and 3, which carries the roll of wrapping material 30, comprises a sleeve 50 rotatably mounted on a stud 51 secured to the yoke 16. In order to prevent the unnecessary unwinding of the wrapping material from the reel, due to the momentum of the latter after the cutting mechanism has operated to sever the said material, brake mechanism of the following construction is provided in conjunction with the said reel. Cam members 60 and 61 are positioned on the stud 51 adjacent one end of the sleeve 50. The cam member 60 has a cam surface on one end cooperating with a complementary cam surface on the cam member 61. The opposite end of the cam member 60 bears against the end of the sleeve 50, while the cam member 61 is secured to the yoke 16. The cam member 61 is fixed with relation to the shaft 51, while the member 60 has a limited movement with respect thereto. Attached to the cam member 60 by a pin 63 is a link 62 connected with a third arm 66 on the hub 65, so as to be operated when the knife 37 is operated to sever the strip of wrapping material.

In operation, the link 62 is moved to the left by the measuring and cutting mechanism when the latter is actuated. The cam surface of the cam member 60 is therefore caused to bear against the cam surface of the member 61 and the opposite end of the cam member 60 is thereby pressed against the sleeve 50, applying a braking action to said sleeve and resisting its further rotation upon the stud 51.

Having thus described my invention, I claim:

1. In a wrapping machine, a reel to carry a roll of wrapping material to be fed to the work, said reel comprising a sleeve and a stud secured to the frame of said machine and on which said sleeve is rotatably mounted, an automatically actuated brake for said reel mounted on said stud, said brake having cooperating cam members, and actuating means controlled by the wrapping operation of the machine and operated at a predetermined time during said wrapping operation for moving one of said cam members with respect to the other.

2. In a wrapping machine, automatic measuring and cutting mechanism for the wrapping material to be fed to the work, a reel to carry a roll of said wrapping material, said reel comprising a sleeve, a stud secured to the frame of said machine and on which said sleeve is rotatably mounted, an automatic brake for said reel mounted on said stud, said brake comprising a fixed cam member secured to the frame of the machine and a movable cooperating cam member, and means connecting said movable cam member and said automatic measuring and cutting mechanism for rotating said movable cam member on said stud when the wrapping material is cut.

3. In a machine of the class described, a reel to carry a roll of wrapping material to be fed to the work, said reel comprising a stud secured to the frame of said machine and a sleeve rotatably mounted on said stud, a brake for said reel mounted on said stud, said brake comprising cooperating cam members, cutting mechanism to sever said wrapping material at a predetermined point in the operation of the machine, and a connection between said cutting mechanism and brake to rotate one of said cam members with respect to the other.

4. In a wrapping machine, means for feeding a strip of wrapping material to the work, a reel to carry a roll of said wrapping material, said reel comprising a stud and a sleeve rotatably mounted thereon, a brake for said reel comprising cooperating cam members mounted on said stud, a hub having an arm, measuring mechanism for turning said hub at a predetermined time, a knife on said arm for cutting said strip, and a connection between said hub and reel brake for relatively rotating said cam members when said hub is turned.

In testimony whereof I affix my signature.

PHILIP O. TENGBERG.